US012346054B2

(12) United States Patent
Sato

(10) Patent No.: US 12,346,054 B2
(45) Date of Patent: Jul. 1, 2025

(54) IMAGE FORMING APPARATUS

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 5 days.

(21) Appl. No.: 18/309,854

(22) Filed: May 1, 2023

(65) Prior Publication Data

US 2023/0266706 A1 Aug. 24, 2023

Related U.S. Application Data

(63) Continuation of application No. 17/845,161, filed on Jun. 21, 2022, now Pat. No. 11,675,305, which is a (Continued)

(30) Foreign Application Priority Data

Jun. 19, 2018 (JP) ................................ 2018-116242

(51) Int. Cl.
*G03G 21/12* (2006.01)
*G03G 21/18* (2006.01)

(52) U.S. Cl.
CPC ............ *G03G 21/12* (2013.01); *G03G 21/18* (2013.01); *G03G 21/1839* (2013.01)

(58) Field of Classification Search
CPC .. G03G 21/0005; G03G 21/007; G03G 21/12; G03G 21/18; G03G 21/105;
(Continued)

(56) References Cited

U.S. PATENT DOCUMENTS 5,541,714 A 7/1996 Watanabe et al.
9,176,457 B2 11/2015 Yoshino et al.
(Continued)

FOREIGN PATENT DOCUMENTS

JP 6-19306 A 1/1994
JP 2002-072811 A 3/2002
(Continued)

OTHER PUBLICATIONS

Japanese Office Action for the related Japanese Patent Application No. 2018-116242 dated Apr. 26, 2022.

*Primary Examiner* — Thomas S Giampaolo, II
(74) *Attorney, Agent, or Firm* — KENEALY VAIDYA LLP

(57) ABSTRACT

An image forming apparatus includes a photosensitive drum, a developing device, a toner container, a cleaner, a waste toner container, and a waste toner conveying pipe. The cleaner is configured to clean a peripheral surface of the photosensitive drum after a toner image has been transferred to the printing medium. The waste toner container is configured to accommodate therein waste toner removed from the peripheral surface of the photosensitive drum by the cleaner. The waste toner conveying pipe is configured to convey the waste toner from the cleaner to the waste toner container. The cleaner is located between the photosensitive drum and the fixing device in a vertical direction. The developing device is located below the photosensitive drum. The waste toner container is located below the cleaner. The toner container covers at least a part of an upper surface of the waste toner container.

11 Claims, 10 Drawing Sheets

Related U.S. Application Data continuation of application No. 17/107,460, filed on Nov. 30, 2020, now Pat. No. 11,409,223, which is a continuation of application No. 16/842,694, filed on Apr. 7, 2020, now Pat. No. 10,852,691, which is a continuation of application No. 16/442,201, filed on Jun. 14, 2019, now Pat. No. 10,691,059.

(58) Field of Classification Search
CPC ............. G03G 21/169; G03G 21/1839; G03G 2221/0005; G03G 2221/0015; G03G 2221/1618; G03G 2221/1624
See application file for complete search history.

(56) References Cited

U.S. PATENT DOCUMENTS

| | | | | |
|---|---|---|---|---|
| 9,342,035 | B2 | 5/2016 | Sato | |
| 10,691,059 | B2 | 6/2020 | Sato | |
| 10,866,560 | B2 | 12/2020 | Sato | |
| 2008/0317483 | A1 | 12/2008 | Tanimoto et al. | |
| 2009/0154973 | A1 * | 6/2009 | Shimizu | G03G 21/105 399/358 |
| 2009/0232570 | A1 | 9/2009 | Ozawa | |
| 2010/0239340 | A1 | 9/2010 | Akaike et al. | |
| 2011/0236054 | A1 | 9/2011 | Mori et al. | |
| 2011/0293316 | A1 | 12/2011 | Sato et al. | |
| 2012/0207510 | A1 | 8/2012 | Sato | |
| 2013/0004200 | A1 | 1/2013 | Okabe | |
| 2013/0136488 | A1 | 5/2013 | Yoshikawa | |
| 2014/0186071 | A1 | 7/2014 | Sato | |
| 2016/0139558 | A1 | 5/2016 | Kawakami et al. | |
| 2016/0154341 | A1 | 6/2016 | Hamada et al. | |
| 2016/0195837 | A1 * | 7/2016 | Matsuura | G03G 15/1675 399/66 |
| 2017/0003646 | A1 | 1/2017 | Hiramatsu et al. | |
| 2017/0160697 | A1 | 6/2017 | Sato et al. | |
| 2018/0095418 | A1 | 4/2018 | Sato et al. | |
| 2018/0267459 | A1 * | 9/2018 | Sato | G03G 21/1821 |
| 2019/0258192 | A1 | 8/2019 | Sato | |

FOREIGN PATENT DOCUMENTS

| | | | |
|---|---|---|---|
| JP | 2010-8472 | A | 1/2010 |
| JP | 2010-224004 | A | 10/2010 |
| JP | 2012-168272 | A | 9/2012 |
| JP | 2013-011778 | A | 1/2013 |
| JP | 2013-137494 | A | 7/2013 |
| JP | 2014-025995 | A | 2/2014 |
| JP | 2014-126845 | A | 7/2014 |
| JP | 2016-009045 | A | 1/2016 |
| JP | 2016-99403 | A | 5/2016 |
| JP | 2016-110097 | A | 6/2016 |
| JP | 2017-15950 | A | 1/2017 |
| JP | 2017-106980 | A | 6/2017 |
| JP | 2018-055066 | A | 4/2018 |

* cited by examiner

IMAGE FORMING APPARATUS

CROSS-REFERENCE TO RELATED APPLICATIONS

This application is a continuation application claiming priority benefit under 35 U.S.C. 120 of pending U.S. patent application Ser. No. 17/845,161 filed on Jun. 21, 2022, which claims priority to U.S. patent application Ser. No. 17/107,460 filed on Nov. 30, 2020 now U.S. Pat. No. 11,409,223 issued on Aug. 9, 2022, which in turn claims priority to U.S. patent application Ser. No. 16/842,694 filed on Apr. 7, 2020 now U.S. Pat. No. 10,852,691 issued on Dec. 1, 2020, which in turn claims priority to U.S. patent application Ser. No. 16/442,201 filed on Jun. 14, 2019 now U.S. Pat. No. 10,691,059 issued on Jun. 23, 2020, which are based upon and claim the benefit of priority under 35 U.S.C. 119 from prior Japanese patent application No. 2018-116242, filed on Jun. 19, 2018, the entire contents of all of which are incorporated herein by reference.

TECHNICAL FIELD

The present disclosure relates to an image forming apparatus.

BACKGROUND

In related art, an image forming apparatus includes a photosensitive drum, a cleaner, a waste toner container, and a waste toner conveying pipe. The cleaner is configured to remove waste toner from a peripheral surface of the photosensitive drum after a toner image is transferred to a printing medium. In the waste toner container, waste toner removed from the peripheral surface of the photosensitive drum by the cleaner is accommodated. The waste toner conveying pipe is configured to convey the waste toner from the cleaner to the waste toner container.

In the image forming apparatus as disclosed in related art, the waste toner conveying pipe is configured to convey the waste toner in a substantially horizontal direction from the cleaner to the waste toner container.

For this reason, the waste toner is likely to be accumulated in the vicinity of an inner surface of a lower side of the waste toner conveying pipe. Also, when the accumulated waste toner is pushed and consolidated between a screw and the inner surface of the waste toner conveying pipe, the waste toner conveying pipe may be blocked.

SUMMARY

Aspect of non-limiting embodiments of the present disclosure provides an image forming apparatus including a cleaner located between a photosensitive drum and a fixing device in a vertical direction and capable of smoothly conveying waste toner from the cleaner to a waste toner container.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

An image forming apparatus configured to form an image on a printing medium, the image forming apparatus including: a photosensitive drum rotatable relative to a rotary axis extending in an axial direction; an exposure device configured to expose the photosensitive drum to form a latent image on a peripheral surface of the photosensitive drum; a developing device including a developing roller configured to form a toner image by developing the latent image formed on the photosensitive drum by toner; a toner container configured to accommodate therein toner that is to be supplied to the developing roller; a transfer roller configured to transfer the toner image formed on the photosensitive drum to the printing medium; a fixing device configured to fix the toner image, which has been transferred to the printing medium, on the printing medium, and being spaced upward from the photosensitive drum; a cleaner configured to remove waste toner from a peripheral surface of the photosensitive drum after the toner image has been transferred to the printing medium; a waste toner container configured to accommodate therein the waste toner removed from the peripheral surface of the photosensitive drum by the cleaner; and a waste toner conveying pipe configured to convey the waste toner from the cleaner to the waste toner container, wherein the cleaner is located between the photosensitive drum and the fixing device in a vertical direction, wherein the developing device is located below the photosensitive drum, wherein the waste toner container is located below the cleaner, and wherein the toner container covers at least a part of an upper surface of the waste toner container.

DETAILED DESCRIPTION

1. Outline of Image Forming Apparatus of First Exemplary Embodiment

Figure 1:
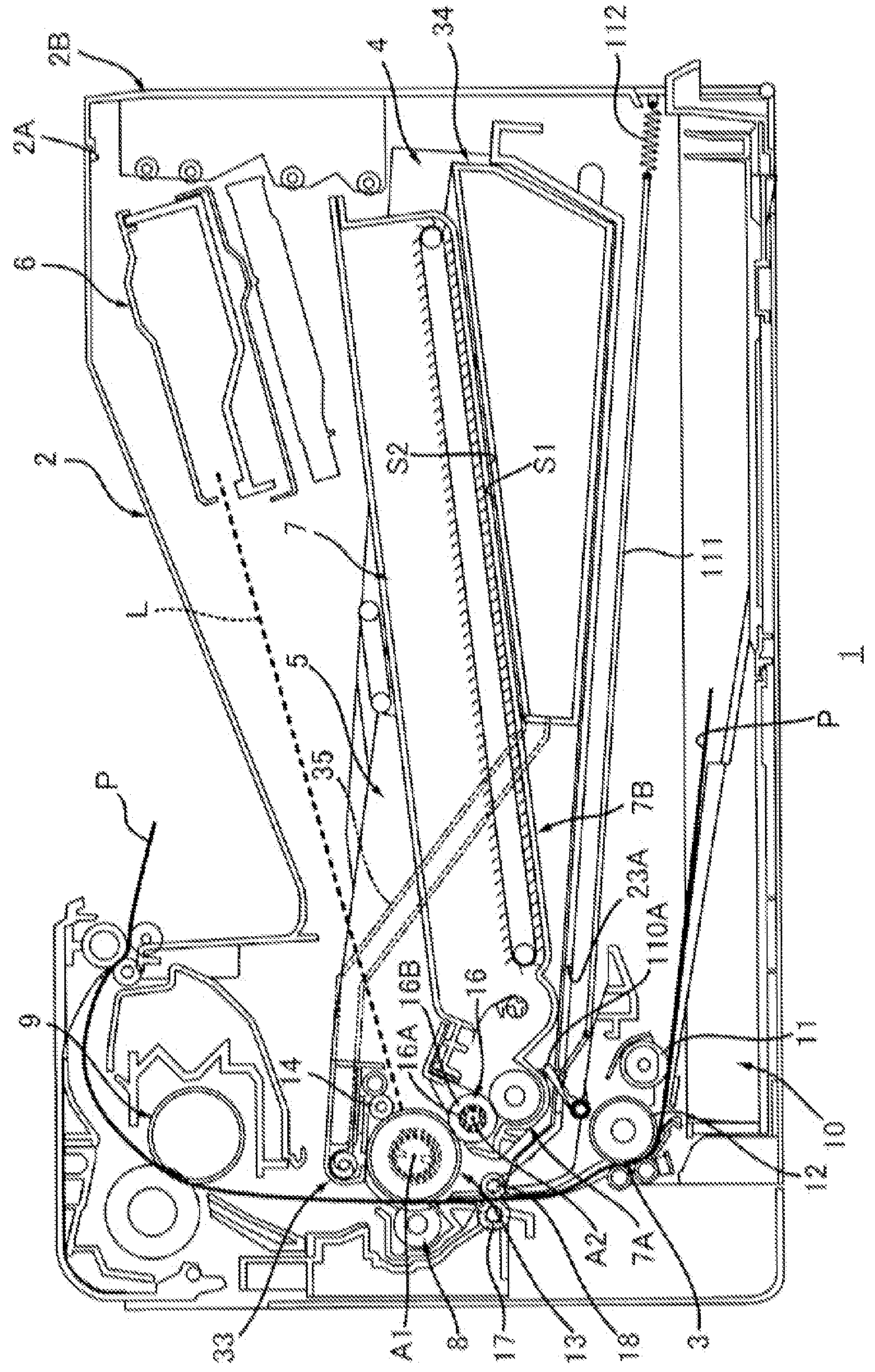
FIG. 1 is a schematic configuration view of an image forming apparatus according to a first exemplary embodiment.
Figure 2:
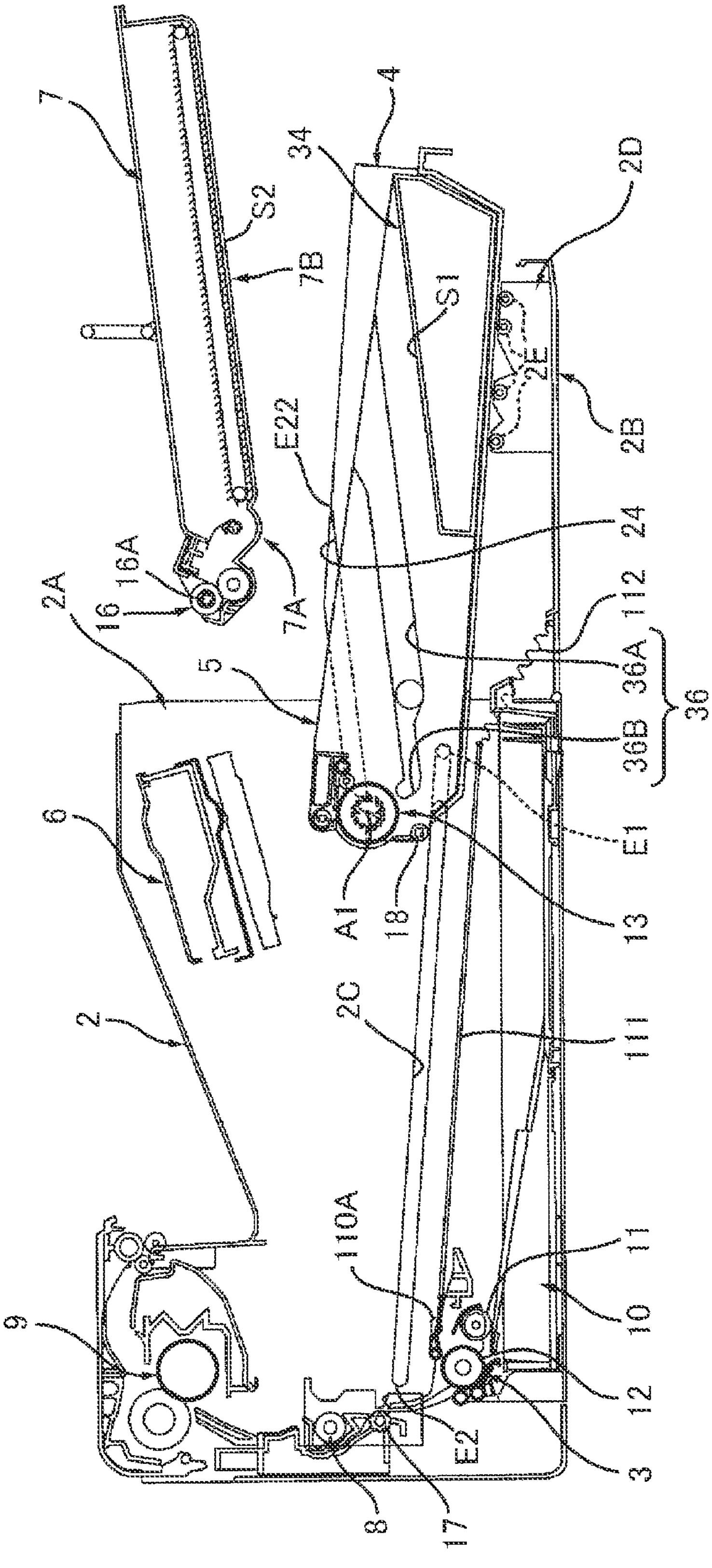
FIG. 2 depicts a state where a drawer shown in FIG. 1 is located at an outer position and a developing cartridge is demounted from the drawer.
Figure 3:
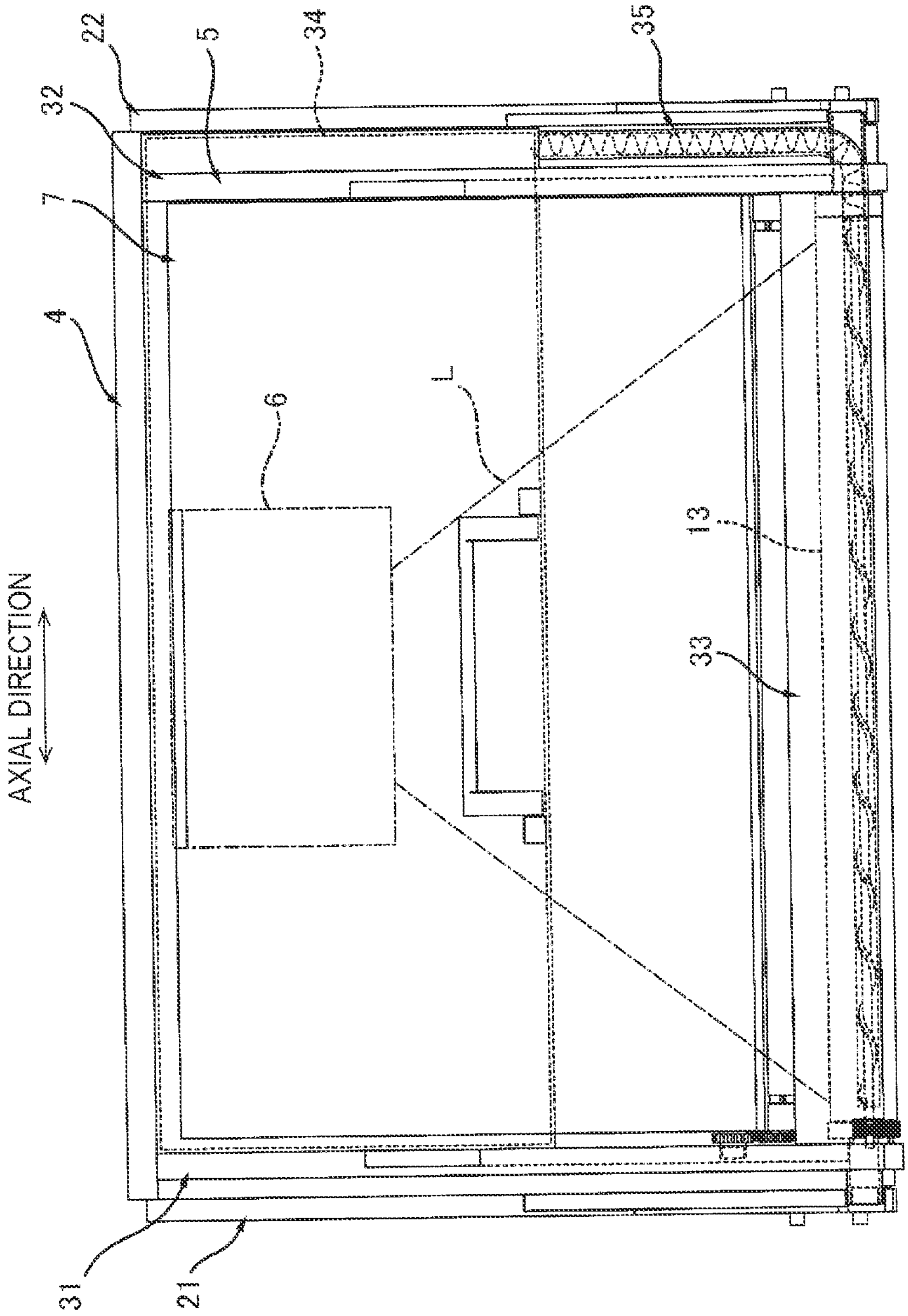
FIG. 3 illustrates a scanning range of a laser scan unit shown in FIG. 1.

Referring to FIGS. 1 to 3, an outline of an image forming apparatus 1 of a first exemplary embodiment is described.

As shown in FIG. 1, the image forming apparatus 1 is configured to form an image on a printing medium P. The image forming apparatus 1 includes a main body housing 2, a feeder unit 3, a drawer 4, a drum cartridge 5, an exposure device 6, a developing cartridge 7, a transfer roller 8, and a fixing device 9.

1.1 Main Body Housing

The main body housing 2 is configured to accommodate therein the feeder unit 3, the drawer 4, the drum cartridge 5, the exposure device 6, the developing cartridge 7, the transfer roller 8, and the fixing device 9. The main body housing 2 has an opening 2A and a cover 2B.

The opening 2A is located at an opposite side to the transfer roller 8 with respect to the drum cartridge 5 in a state where the drum cartridge 5 is mounted to the main body housing 2.

The cover 2B is configured to be movable between an opening position (see FIG. 1) at which the opening 2A is opened and a closing position (see FIG. 2) at which the opening 2A is closed.

1.2 Feeder Unit

The feeder unit 3 is configured to feed the printing medium P to the photosensitive drum 13. The printing medium P is a printing sheet, for example. The photosensitive drum 13 will be described later. The feeder unit 3 includes a cassette 10, a pickup roller 11, a feeder roller 12, and a conveying roller 17. The cassette 10 can accommodate therein the printing medium P. The cassette 10 is mountable to the main body housing 2. The cassette 10 is located below the drawer 4 located at an inner position in a state where the cassette 2 is mounted to the main body housing 2. The inner position at which the drawer 4 is located will be described later. The pickup roller 11 is configured to pick up the printing medium P in the cassette 10 and to convey the same toward the feeder roller 12. The pickup roller 11 is located closer to the fixing device 9 than to the opening 2A in a horizontal direction in a state where the cover 2B is located at the closing position. The feeder roller 12 is configured to convey the printing medium P from the pickup roller 11 toward the conveying roller 17. The conveying roller 17 is configured to convey the printing medium P from the feeder roller 12 toward the photosensitive drum 13.

1.3 Drawer

As shown in FIGS. 1 and 2, the drawer 4 is movable between an inner position (see FIG. 1) and an outer position (see FIG. 2). When the drawer 4 is located at the inner position, the drawer 4 is located inside the main body housing 2. When the drawer 4 is located at the outer position, the drawer 4 is located outside the main body housing 2. The drawer 4 is movable through the opening 2A between the inner position and the outer position in the state where the cover 2B is located at the opening position. The drawer 4 is configured to move upward as the drawer 4 moves from the outer position toward the inner position. In other words, the drawer 4 is configured to move downward as the drawer 4 moves from the inner position toward the outer position. The drawer 4 is configured to support the drum cartridge 5 and the developing cartridge 7. The drawer 4 is movable between the inner position and the outer position while supporting the drum cartridge 5 and the developing cartridge 7. The drawer 4 is configured to come into contact with a part of the main body housing 2 and to be thus stopped at the outer position.

Specifically, as shown in FIG. 2, the main body housing 2 has a guide groove 2C. The guide groove 2C extends in a moving direction of the drawer 4. The guide groove 2C has a first end E1 and a second end E2 in the moving direction of the drawer 4. The second end E2 is spaced from the first end E1 in the moving direction of the drawer 4. Also, the drawer 4 has a projection 4A (see FIGS. 4 and 5). The projection 4A is located on a side surface of the drawer 4 in an axial direction that is a direction in which a rotary axis A1 of the photosensitive drum 13 extends. The projection 4A is fitted in the guide groove 2C. Thereby, the drawer 4 can move along the guide groove 2C. That is, the guide groove 2C is configured to guide movement of the drawer 4. When the drawer 4 is moved from the outer position toward the inner position, the projection 4A is moved from the first end E1 toward the second end E2 with being guided by the guide groove 2C. When the drawer 4 reaches the inner position, the projection 4A comes into contact with the second end E2 of the guide groove 2C, so that the drawer 4 is stopped at the inner position. At this time, the photosensitive drum 13 comes into contact with the transfer roller 8. Also, when the drawer 4 is moved from the inner position toward the outer position, the projection 4A comes into contact with an inner surface of the first end E1 of the guide groove 2C, i.e., a part of the main body housing 2 and is thus stopped at the outer position.

Also, the drawer 4 is supported by the cover 2B located at the opening position in the state where it is located at the outer position. That is, in a state where the cover 2B is located at the opening position and the drawer 4 is located at the outer position, the cover 2B supports the drawer 4. Specifically, the cover 2B has a support part 2D. The support part 2D is in contact with a lower surface of the drawer 4 in the state where the cover 2B is located at the opening position and the drawer 4 is located at the outer position. Thereby, the support part 2D supports the drawer 4 located at the outer position. Also, the support part 2D has a plurality of guide rollers 2E. The plurality of guide rollers 2E is in contact with the lower surface of the drawer 4 in the state where the cover 2B is located at the opening position and the drawer 4 is located at the outer position. Thereby, the drawer 4 can be smoothly moved while being supported by the cover 2B.

Also, as shown in FIGS. 1 and 2, the drawer 4 has a facing roller 18. In the state where the drawer 4 is located at the inner position, the facing roller 18 is in contact with the conveying roller 17. In the state where the facing roller 18 is in contact with the conveying roller 17, the facing roller 18 can rotate as the conveying roller 17 rotates. Thereby, in the state where the drawer 4 is located at the inner position, the facing roller 18 can convey the printing medium P from the feeder roller 12 toward the photosensitive drum 13, together with the conveying roller 17. Also, when the drawer 4 is moved from the inner position toward the outer position, the facing roller 18 separates from the conveying roller 17. Thereby, when the printing medium P is jammed between the conveying roller 17 and the facing roller 18, a user can remove the jammed printing medium P by locating the drawer 4 at the outer position to separate the facing roller 18 from the conveying roller 17.

1.4 Drum Cartridge

As shown in FIG. 1, the drum cartridge 5 is mountable to the drawer 4. The drum cartridge 5 includes the photosensitive drum 13 and a charging roller 14. That is, the image forming apparatus 1 includes the photosensitive drum 13.

The photosensitive drum 13 is configured to be rotatable about a rotary axis A1 extending in the axial direction. The axial direction intersects with the moving direction of the drawer 4. Preferably, the axial direction is perpendicular to the moving direction of the drawer 4. The photosensitive drum 13 extends in the axial direction and has a cylindrical shape. Meanwhile, in the first exemplary embodiment, in the state where the drum cartridge 5 and the developing cartridge 7 are mounted to the drawer 4 and the drawer 4 is located at the inner position, the photosensitive drum 13 is located between the feeder roller 12 and the fixing device 9 in a vertical direction.

The charging roller 14 is configured to charge a peripheral surface of the photosensitive drum 13. The charging roller 14 is in contact with the peripheral surface of the photosensitive drum 13. In the meantime, the drum cartridge 5 may include a non-contact type charger such as a scorotron-type charger, instead of the charging roller 14.

1.5 Exposure Device

The exposure device 6 is configured to expose the photosensitive drum 13 to form a latent image on a peripheral surface of the photosensitive drum 13. Specifically, the exposure device 6 is configured to expose the peripheral surface of the photosensitive drum 13 charged by the charging roller 14. Thereby, a latent image is formed on the peripheral surface of the photosensitive drum 13. The exposure device 6 is located above the drawer 4 located at the inner position. Specifically, the exposure device 6 is a laser scan unit configured to scan the peripheral surface of the photosensitive drum 13 with a laser light L. As shown in FIG. 3, the laser light L emitted from the exposure device 6 toward the photosensitive drum 13 passes between a first drum side plate 31 and a second drum side plate 32 of the drum cartridge 5 in the axial direction in the state where the drum cartridge 5 is mounted to the drawer 4 and the drawer 4 is located at the inner position.

1.6 Developing Cartridge

As shown in FIG. 1, the developing cartridge 7 is attachable to and detachable from the drum cartridge 5. The developing cartridge 7 includes a developing device 7A and a toner container 7B. That is, the image forming apparatus 1 includes the developing device 7A and the toner container 7B.

The developing device 7A includes a developing roller 16. That is, the developing device 7A is a part of the developing cartridge 7 configured to support the developing roller 16. The developing device 7A is located below the photosensitive drum 13 in the state where the drum cartridge 5 and the developing cartridge 7 are mounted to the drawer 4.

The developing roller 16 is located below the photosensitive drum 13 in the state where the drum cartridge 5 and the developing cartridge 7 are mounted to the drawer 4. The developing roller 16 is in contact with the photosensitive drum 13 in the state where the drum cartridge 5 and the developing cartridge 7 are mounted to the drawer 4. Thereby, the developing roller 16 can supply toner in the developing cartridge 7 to the photosensitive drum 13 in the state where the drum cartridge 5 and the developing cartridge 7 are mounted to the drawer 4. The developing roller 16 is configured to supply the toner in the developing cartridge 7 to the photosensitive drum 13, thereby developing a latent image formed on the photosensitive drum 13 to form a toner image on the peripheral surface of the photosensitive drum 13. The developing roller 16 is configured to be rotatable relative to a rotary axis A2. The rotary axis A2 of the developing roller 16 is parallel with the rotary axis A1 of the photosensitive drum 13. The developing roller 16 has a shaft 16A and a roller body 16B.

The shaft 16A extends in the axial direction along the rotary axis A2. The shaft 16A has a circular column shape. The shaft 16A penetrates the roller body 16B in the axial direction. The shaft 16A is made of metal.

The roller body 16B extends in the axial direction. The roller body 16B has a circular column shape. The roller body 16B is made of a conductive rubber.

The toner container 7B is configured to accommodate therein the toner that is to be supplied to the developing roller 16. That is, the toner container 7B is a part of the developing cartridge 7 configured to accommodate therein the toner. An internal space of the toner container 7B communicates with an internal space of the developing device 7A. Thereby, the toner in the toner container 7B is supplied to the developing roller 16 of the developing device 7A.

1.7 Transfer Roller

The transfer roller 8 is in contact with the photosensitive drum 13 in the state where the drum cartridge 5 is mounted to the drawer 4 and the drawer 4 is located at the inner position. The printing medium P fed from the cassette 10 passes between the transfer roller 8 and the photosensitive drum 13. At this time, the transfer roller 8 is configured to transfer the toner image formed on the photosensitive drum 13 to the printing medium P.

1.8 Fixing Device

The fixing device 9 is configured to heat and press the printing medium P having the toner image transferred thereto, thereby fixing the toner image, which has been transferred to the printing medium P, on the printing medium P. The fixing device 9 is located with being spaced upward from the photosensitive drum 13 in the state where the drum cartridge 5 is mounted to the drawer 4 and the drawer 4 is located at the inner position. That is, the image forming apparatus 1 is equipped on a horizontal stand or the like so that the fixing device 9 is located above the photosensitive drum 13.

2. Details of Drawer

Subsequently, details of the drawer 4 are described with reference to FIGS. 4 and 5.

Figure 4:
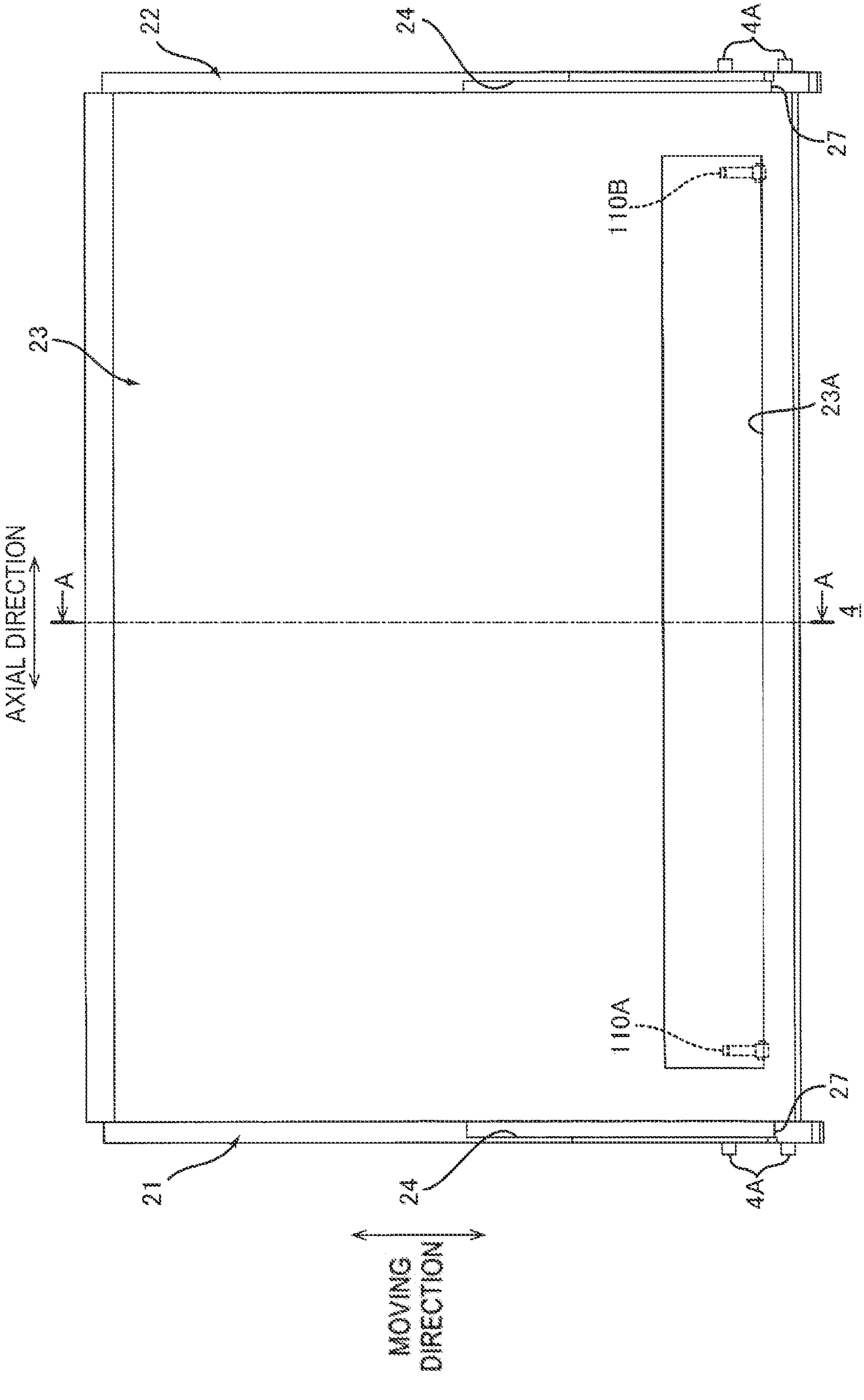
FIG. 4 is a plan view of the drawer shown in FIG. 1.
Figure 5:
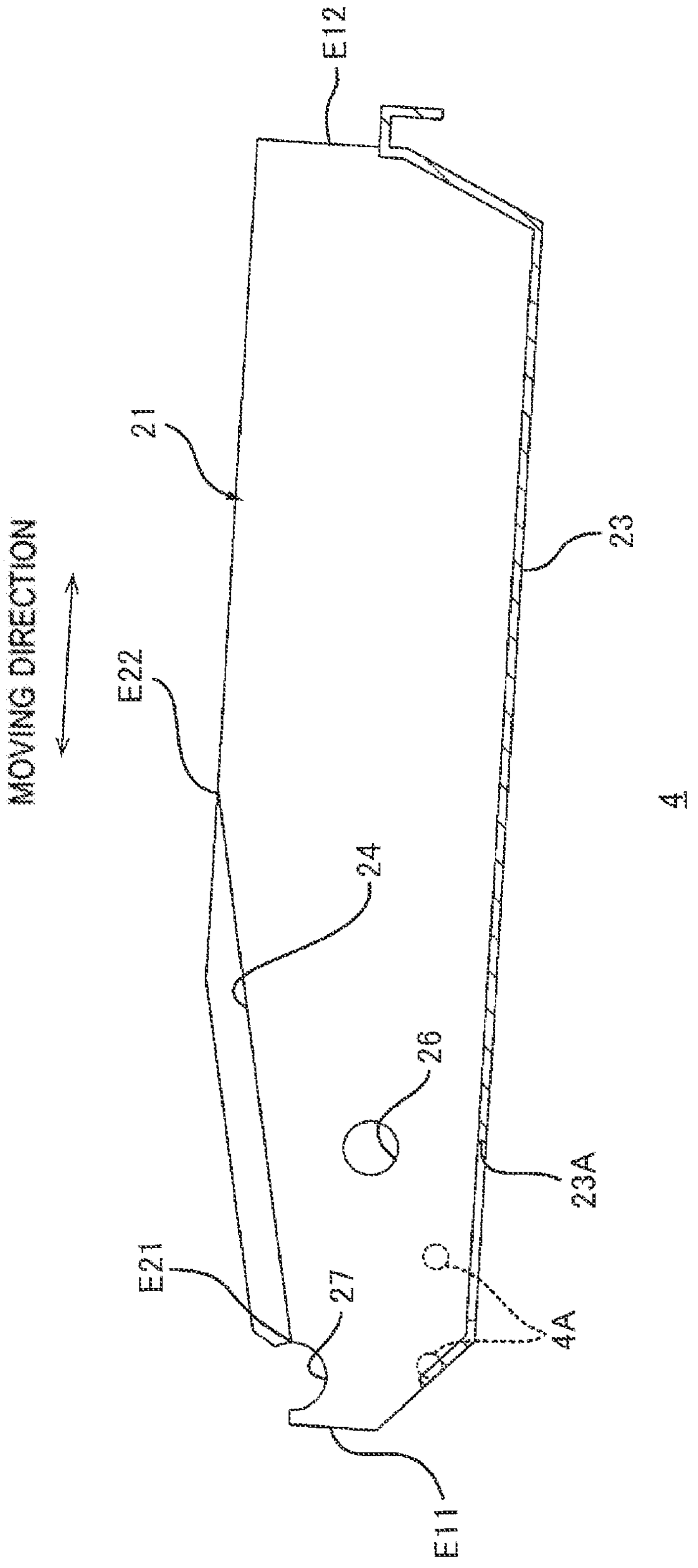
FIG. 5 is a sectional view taken along a line A-A of the drawer shown in FIG. 4.

As shown in FIG. 4, the drawer 4 includes a first drawer side plate 21, a second drawer side plate 22, and a bottom plate 23.

The first drawer side plate 21 is located at a first end of the drawer 4 in the axial direction. The first drawer side plate 21 extends in the moving direction of the drawer 4. As shown in FIG. 5, the first drawer side plate 21 has a first end E11 and a second end E12 in the moving direction of the drawer 4. The second end E12 is spaced from the first end E11 in the moving direction of the drawer 4. The second end E12 is located downstream of the first end E11 in a direction in which the drawer 4 moves from the inner position toward the outer position. Also, the first drawer side plate 21 has a guide 24, a through-hole 26, and a notch 27.

The guide 24 is located on an inner surface of the first drawer side plate 21 in the axial direction. The guide 24 is concave in a direction of getting away from the second drawer side plate 22 in the axial direction. The guide 24 is located between the first end E11 and the second end E12 in the moving direction of the drawer 4. The guide 24 extends in a direction of intersecting with the moving direction of the drawer 4. The guide 24 has a first end E21 and a second end E22. The first end E21 is located closer to the first end E11 than the second end E22 in the moving direction of the drawer 4. The first end E21 is connected to the notch 27. The second end E22 is located closer to the second end E12 than the first end E21 in the moving direction of the drawer 4. The guide 24 is inclined downward from the second end E22 toward the first end E21. In the state where the drawer 4 is located at the outer position, the second end E22 (see FIG. 2) of the guide 24 is exposed to an outside from the opening 2A of the main body housing 2. In the state where the drawer 4 is located at the outer position, when the drum cartridge 5 is being mounted to the drawer 4, the projection 5A (see FIG. 6) of the drum cartridge 5 is fitted in the guide 24. Thereby, in the state where the drawer 4 is located at the outer position, when the drum cartridge 5 is being mounted to the drawer 4, the guide 24 guides the projection 5A of the drum cartridge 5.

The through-hole 26 is located below the guide 24 in the vertical direction. The through-hole 26 has a circular shape. In the state where the developing cartridge 7 is attached to the drum cartridge 5 and the drum cartridge 5 is mounted to the drawer 4, a developing coupling (not shown) of the developing cartridge 7 is exposed through the through-hole 26. In the state where the developing cartridge 7 is attached to the drum cartridge 5, the drum cartridge 5 is mounted to the drawer 4 and the drawer 4 is located at the inner position, a first main body coupling (not shown) is coupled to the developing coupling. At this time, the first main body coupling is inserted in the through-hole 26.

The notch 27 is connected to the first end E21 of the guide 24. The notch 27 has a semicircular shape. In the state where the drum cartridge 5 is mounted to the drawer 4, the projection 5A of the drum cartridge 5 is fitted in the notch 27 and a drum coupling 100 (see FIG. 6) is exposed through the notch 27. In the state where the drum cartridge 5 is mounted to the drawer 4 and the drawer 4 is located at the inner position, a second main body coupling (not shown) is coupled to the drum coupling 100. At this time, the second main body coupling is inserted in the notch 27.

As shown in FIG. 4, the second drawer side plate 22 is located at a second end of the drawer 4 in the axial direction. The second drawer side plate 22 is spaced from the first drawer side plate 21 in the axial direction. The second drawer side plate 22 has the same shape as the first drawer side plate 21, except that it is not formed with the through-hole 26.

The bottom plate 23 is located between the first drawer side plate 21 and the second drawer side plate 22 in the axial direction. The bottom plate 23 extends in the axial direction. A first end of the bottom plate 23 in the axial direction is connected to the first drawer side plate 21. A second end of the bottom plate 23 in the axial direction is connected to the second drawer side plate 22. The bottom plate 23 has an opening 23A.

The opening 23A extends in the axial direction. In the state where the drawer 4 is located at the inner position and the cover 2B is located at the closing position, two pressing members 110A, 110B provided in the main body housing 2 are located in the opening 23A.

In the meantime, as shown in FIGS. 1 and 2, the pressing member 110A is movable through the opening 23A between a pressing position (see FIG. 1) and a press-releasing position (see FIG. 2).

The pressing member 110A is connected to the cover 2B via a bar 111 and a tension spring 112. The pressing member 110A is configured to move from the press-releasing position to the pressing position, in conjunction with movement of the cover 2B from the opening position to the closing position. As shown in FIG. 1, in a state where the developing cartridge 7 is attached to the drum cartridge 5, the drum cartridge 5 is mounted to the drawer 4, the drawer 4 is located at the inner position, and the cover 2B is located at the closing position, the pressing member 110A is located at the pressing position. Then, the pressing member 110A presses the developing device 7A of the developing cartridge 7 toward the photosensitive drum 13. Thereby, the developing roller 16 is pressed to the photosensitive drum 13.

Also, the pressing member 110A is configured to move from the pressing position to the press-releasing position, in conjunction with movement of the cover 2B from the closing position to the opening position. As shown in FIG. 2, in the state where the cover 2B is located at the opening position, the pressing member 110A is located at the press-releasing position. Then, the pressed state of the developing device 7A by the pressing member 110A is released.

3. Details of Drum Cartridge

Subsequently, details of the drum cartridge 5 are described with reference to FIGS. 6 to 8.

Figure 6:
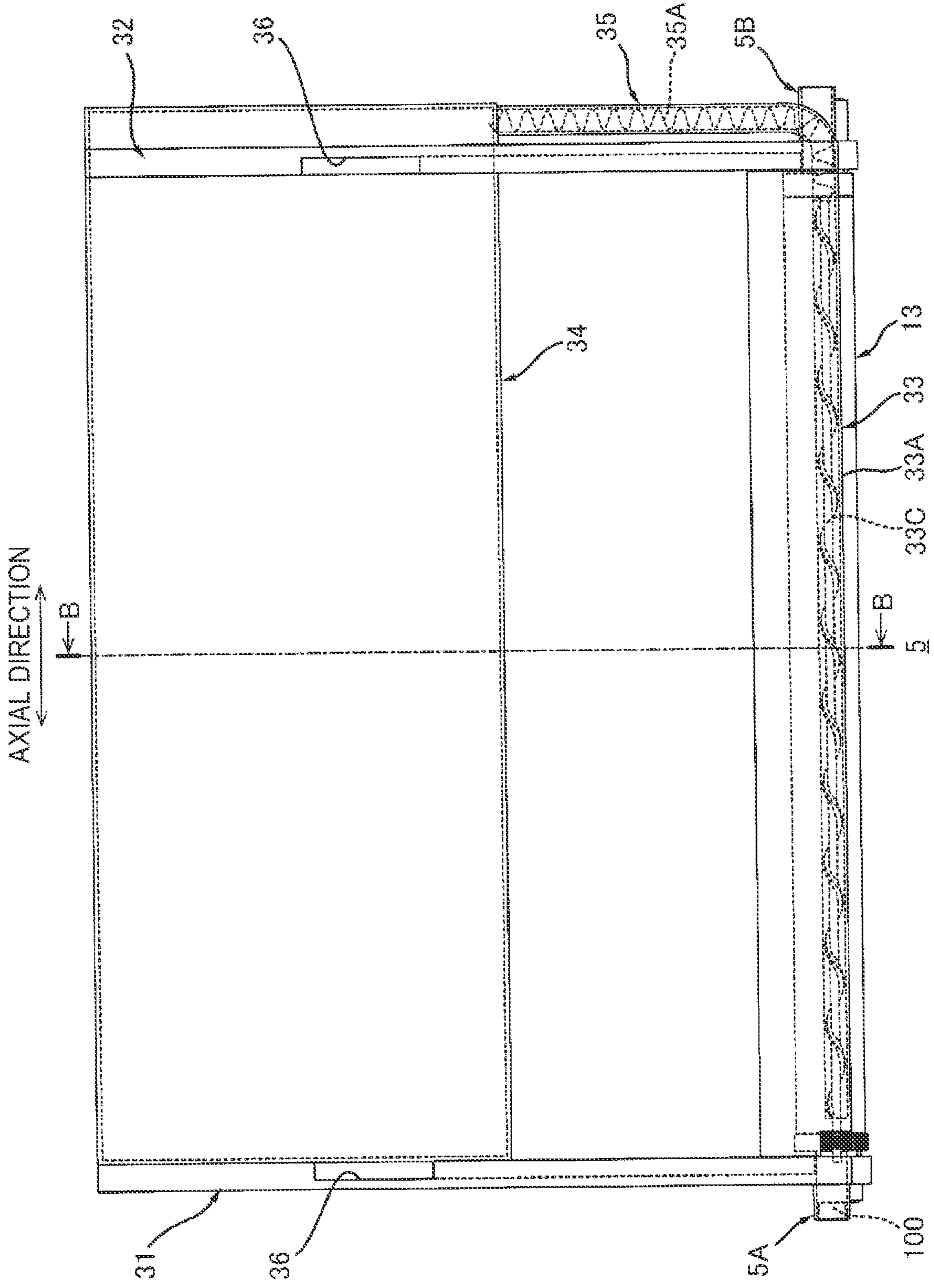
FIG. 6 is a plan view of a drum cartridge shown in FIG. 1.

As shown in FIG. 6, the drum cartridge 5 includes a first drum side plate 31, a second drum side plate 32, a cleaner 33, a waste toner container 34, and a waste toner conveying pipe 35, in addition to the photosensitive drum 13 and the charging roller 14. That is, the image forming apparatus 1 includes the cleaner 33, the waste toner container 34, and the waste toner conveying pipe 35.

3.1 First Drum Side Plate and Second Drum Side Plate

The first drum side plate 31 is located at a first end of the drum cartridge 5 in the axial direction. The first drum side plate 31 extends in a direction of intersecting with the axial direction. Preferably, the first drum side plate 31 extends in a direction perpendicular to the axial direction. The first drum side plate 31 has a projection 5A, a guide 36, and a through-hole 37 (see FIG. 7).

The projection 5A is located on an outer surface of the first drum side plate 31 in the axial direction. In other words, the projection 5A is located at an opposite side to the second drum side plate 32 with respect to the first drum side plate 31 in the axial direction. The projection 5A extends in the axial direction. The projection 5A has a cylindrical shape. The projection 5A is configured to cover a peripheral surface of the drum coupling 100. That is, the guide 24 guides the drum coupling 100 to the notch 27 when the drum cartridge 5 is being mounted to the drawer 4 in the state where the drawer 4 is located at the outer position. The drum coupling 100 is mounted to the first end of the photosensitive drum 13 in the axial direction and can be thus rotated together with the photosensitive drum 13. In the state where the drum cartridge 5 is mounted to the drawer 4 and the drawer 4 is located at the inner position, the drum coupling 100 is fed with power from the image forming apparatus 1.

Figure 7:
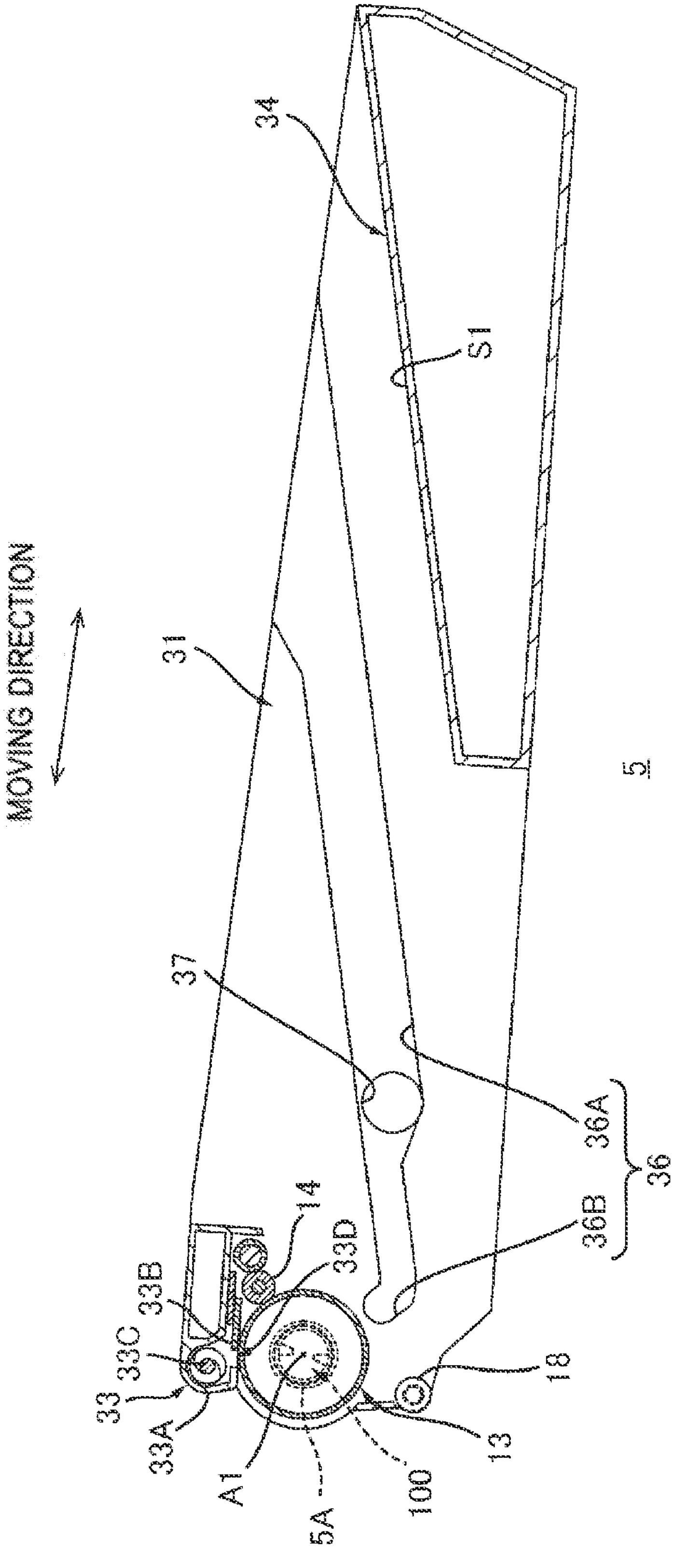
FIG. 7 is a sectional view taken along a line B-B of the drum cartridge shown in FIG. 6.
Figure 8:
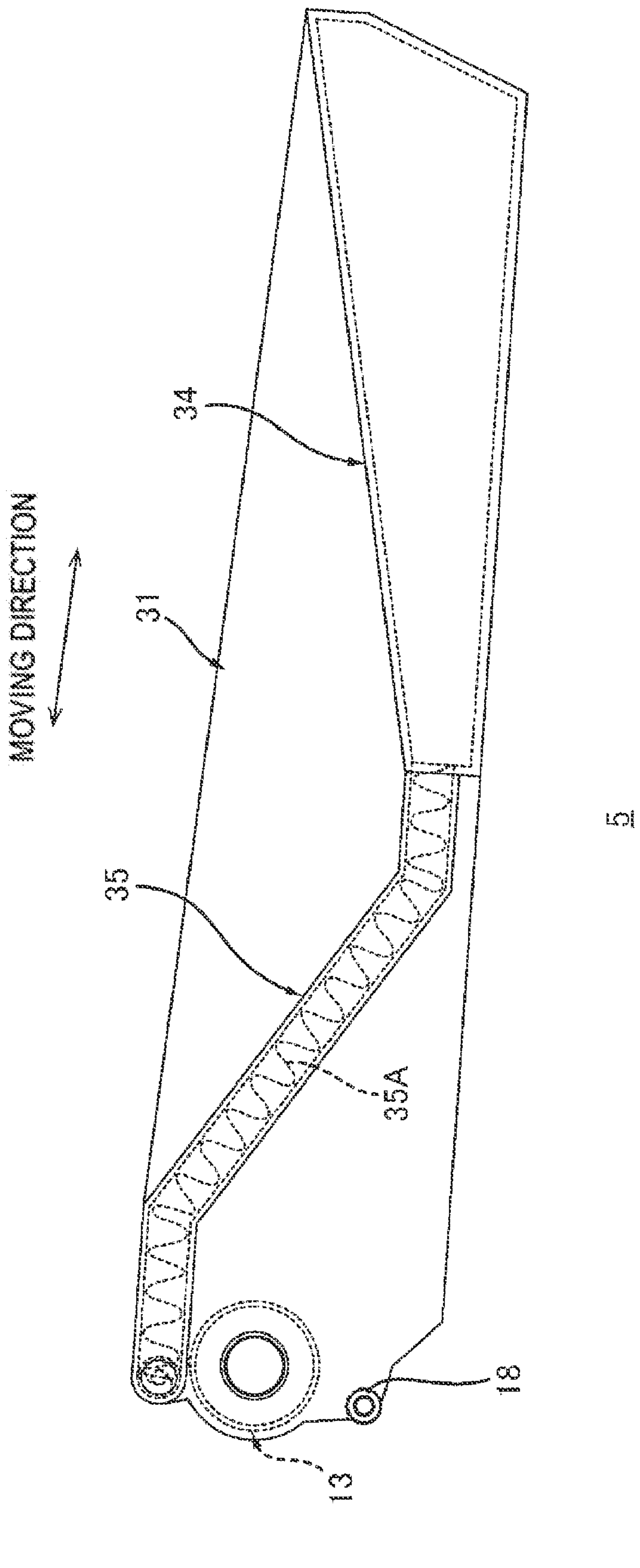
FIG. 8 is a side view of the drum cartridge shown in FIG. 6.

As shown in FIG. 7, the guide 36 is located below the rotary axis A1 of the photosensitive drum 13 in the state where the drum cartridge 5 is mounted to the drawer 4. The shaft 16A (see FIG. 1) of the developing roller 16 is fitted in the guide 36 when the developing cartridge 7 is being attached to the drum cartridge 5. Thereby, the guide 36 guides the shaft 16A of the developing roller 16 when the developing cartridge 7 is being attached to the drum cartridge 5. The guide 36 has a first part 36A and a second part 36B.

The first part 36A extends in a direction of intersecting with the moving direction of the drawer 4 in the state where the drum cartridge 5 is mounted to the drawer 4. The first part 36A extends in a direction in which the first part 36A faces downward as it comes close to the photosensitive drum 13.

The second part 36B is located between the first part 36A and the photosensitive drum 13. The second part 36B extends in a direction of intersecting with the direction in which the first part 36A extends. Specifically, the second part 36B extends in a direction of connecting the rotary axis A1 of the photosensitive drum 13 and the rotary axis A2 (see FIG. 1) of the developing roller 16 in the state where the developing cartridge 7 is attached to the drum cartridge 5 and the drum cartridge 5 is mounted to the drawer 4. The second part 36B is connected to the first part 36A.

The through-hole 37 is formed at an intermediate position of the guide 36. The through-hole 37 has a circular shape. In the state where the developing cartridge 7 is attached to the drum cartridge 5, the through-hole 37 is aligned in a line with the through-hole 26 (see FIG. 5) of the drawer 4 in the axial direction. Thereby, in the state where the developing cartridge 7 is attached to the drum cartridge 5 and the drum cartridge 5 is mounted to the drawer 4, the first main body coupling is coupled to the developing coupling via the through-hole 26 and the through-hole 37.

As shown in FIG. 6, the second drum side plate 32 is located at a second end of the drum cartridge 5 in the axial direction. The second drum side plate 32 is spaced from the first drum side plate 31 in the axial direction. The second drum side plate 32 has a projection 5B. In the meantime, the second drum side plate 32 has the same shape as the first drum side plate 31, except that it is not formed with the through-hole 37 and has the projection 5B.

The projection 5B is located on an outer surface of the second drum side plate 32 in the axial direction. In other words, the projection 5B is located at an opposite side to the first drum side plate 31 with respect to the second drum side plate 32 in the axial direction. The projection 5B extends in the axial direction. The projection 5B has a circular column shape. The projection 5B is fitted in the guide 24 (see FIG. 4) of the second drawer side plate 22 and is guided to the notch 27 by the guide 24 when the drum cartridge 5 is being mounted to the drawer 4. Thereby, the guide 24 of the second drawer side plate 22 guides the projection 5B of the drum cartridge 5 when the drum cartridge 5 is being mounted to the drawer 4 in the state where the drawer 4 is located at the outer position.

3.2 Cleaner

As shown in FIG. 7, the cleaner 33 is located around the photosensitive drum 13. The cleaner 33 is located between the photosensitive drum 13 and the fixing device 9 (see FIG. 1) in the vertical direction in the state where the drum cartridge 5 is mounted to the drawer 4 and the drawer 4 is located at the inner position. The cleaner 33 is configured to remove waste toner from the peripheral surface of the photosensitive drum 13 after the toner image is transferred to the printing medium P. Specifically, the cleaner 33 includes a cleaner frame 33A, a cleaning blade 33B, and a screw 33C.

As shown in FIG. 6, the cleaner frame 33A is located between the first drum side plate 31 and the second drum side plate 32 in the axial direction. The cleaner frame 33A extends in the axial direction. A first end of the cleaner frame 33A in the axial direction is connected to the first drum side plate 31. A second end of the cleaner frame 33A in the axial direction is connected to the second drum side plate 32. As shown in FIG. 7, the cleaner frame 33A has an opening 33D. The opening 33D faces the peripheral surface of the photosensitive drum 13. The opening 33D communicates with an internal space of the cleaner frame 33A. The opening 33D extends in the axial direction.

The cleaning blade 33B is attached to the cleaner frame 33A. An end portion of the cleaning blade 33B is located in the opening 33D. The end portion of the cleaning blade 33B is in contact with the peripheral surface of the photosensitive drum 13. Thereby, when the photosensitive drum 13 is rotated, the waste toner remaining on the peripheral surface of the photosensitive drum 13 is scraped by the cleaning blade 33B and is then accommodated in the internal space of the cleaner frame 33A through the opening 33D. Thereby, the cleaner 33 removes the waste toner from the peripheral surface of the photosensitive drum 13.

The screw 33C is located in the cleaner frame 33A. The screw 33C extends in the axial direction. Thereby, the screw 33C is configured to convey the waste toner accommodated in the cleaner frame 33A in the axial direction.

3.3 Waste Toner Container

As shown in FIG. 7, the waste toner container 34 is spaced from the cleaner 33. Specifically, the waste toner container 34 is spaced from the cleaner 33 in the moving direction of the drawer 4 in the state where the drum cartridge 5 is mounted to the drawer 4. The waste toner container 34 is located below the cleaner 33 in the state where the drum cartridge 5 is mounted to the drawer 4. The waste toner container 34 is configured to accommodate therein the waste toner removed from the peripheral surface of the photosensitive drum 13 by the cleaner 33. Specifically, the waste toner removed from the peripheral surface of the photosensitive drum 13 by the cleaner 33 is conveyed from the cleaner 33 to the waste toner container 34 by the waste toner conveying pipe 35 (see FIG. 8). The waste toner container 34 is configured to accommodate therein the waste toner conveyed by the waste toner conveying pipe 35. The waste toner container 34 extends in the axial direction and has a box shape. An upper surface S1 of the waste toner container 34 extends in the same direction as the first part 36A of the guide 36. The upper surface S1 of the waste toner container 34 extends in a direction in which the upper surface S1 faces downward as it comes close to the photosensitive drum 13. As shown in FIG. 1, the upper surface S1 of the waste toner container 34 is in contact with a lower surface S2 of the toner container 7B of the developing cartridge 7 in the state where the developing cartridge 7 is attached to the drum cartridge 5. That is, the toner container 7B is configured to cover at least a part of the upper surface of the waste toner container 34 in the state where the developing cartridge 7 is attached to the drum cartridge 5.

3.4 Waste Toner Conveying Pipe

As shown in FIG. 6, the waste toner conveying pipe 35 is configured to connect the cleaner 33 and the waste toner container 34. The waste toner conveying pipe 35 is configured to convey the waste toner from the cleaner 33 to the waste toner container 34. Specifically, a screw 35A for conveying the waste toner is located in the waste toner conveying pipe 35. The screw 35A is a shaftless screw. The waste toner conveying pipe 35 is configured to pass an outer side of the second drum side plate 32 in the axial direction.

In other words, the waste toner conveying pipe 35 is configured to pass an opposite side to the first drum side plate 31 with respect to the second drum side plate 32 in the axial direction. Also, the waste toner conveying pipe 35 is configured to pass an outer side of a scanning range (see FIG. 3) of the laser light L from the exposure device 6 in the axial direction. As shown in FIG. 8, in the state where the drum cartridge 5 is mounted to the drawer 4, the waste toner conveying pipe 35 extends downward as the waste toner conveying pipe 35 faces from the cleaner 33 (see FIG. 7) toward the waste toner container 34, as seen from the axial direction. Thereby, it is possible to convey the waste toner from the cleaner 33 toward the waste toner container 34 by using the gravity. For this reason, it is possible to smoothly convey the waste toner from the cleaner 33 toward the waste toner container 34. As shown in FIG. 1, in the state where the developing cartridge 7 is attached to the drum cartridge 5, the waste toner conveying pipe 35 intersects with the toner container 7B, as seen from the axial direction.

4. Mounting of Drum Cartridge and Developing Cartridge to Drawer

Subsequently, mounting of the drum cartridge 5 and the developing cartridge 7 to the drawer 4 is described.

When the drum cartridge 5 is being mounted to the drawer 4, the projection 5A (see FIG. 6) is fitted in the guide 24 (see FIG. 4) of the first drawer side plate 21 and the projection 5B (see FIG. 6) is fitted in the guide 24 (see FIG. 4) of the second drawer side plate 22 in the state where the drawer 4 is located at the outer position, so that the drum cartridge 5 is guided from the outside of the main body housing 2 toward the inside of the main body housing 2.

Then, when the projection 5A is fitted in the notch 27 of the first drawer side plate 21 and the projection 5B is fitted in the notch 27 of the second drawer side plate 22, the mounting of the drum cartridge 5 to the drawer 4 is completed, as shown in FIG. 2.

In the state where the drum cartridge 5 is mounted to the drawer 4, at least a part of the drum cartridge 5 is located in the main body housing 2. Specifically, in the state where the drum cartridge 5 is mounted to the drawer 4 and the drawer 4 is located at the outer position, the photosensitive drum 13 and the second part 36B of the guide 36 are located in the main body housing 2. On the other hand, in the state where the drum cartridge 5 is mounted to the drawer 4 and the drawer 4 is located at the outer position, the first part 36A of the guide 36 of the drum cartridge 5 is located outside the main body housing 2.

Then, in the state where the cover 2B is located at the opening position and the drawer 4 is located at the outer position, the developing cartridge 7 is attachable to and detachable from the drum cartridge 5 with the drum cartridge 5 being mounted to the drawer 4. When the developing cartridge 7 is being attached to the drum cartridge 5, the shaft 16A of the developing roller 16 is guided by the guide 36 of the drum cartridge 5 in the state where the drum cartridge 5 is mounted to the drawer 4 and the drawer 4 is located at the outer position. Also, at this time, the upper surface S1 of the waste toner container 34 comes into contact with the lower surface S2 of the developing cartridge 7, so that the waste toner container 34 guides the developing cartridge 7. Then, as shown in FIG. 1, when the shaft 16A of the developing roller 16 is fitted in the second part 36B of the guide 36 and the developing roller 16 comes into contact with the photosensitive drum 13, the attaching of the developing cartridge 7 to the drum cartridge 5 is completed.

5. Operational Effects

As shown in FIG. 1, according to the image forming apparatus 1, the waste toner conveying pipe 35 conveys the waste toner from the cleaner 33, which is located between the photosensitive drum 13 and the fixing device 9 in the vertical direction, to the waste toner container 34 located below the cleaner 33.

Thereby, it is possible to convey the waste toner, which has been removed from the peripheral surface of the photosensitive drum 13 by the cleaner 33, from the cleaner 33 to the waste toner container 34 by using the gravity.

As a result, it is possible to smoothly convey the waste toner from the cleaner 33 to the waste toner container 34.

Also, as shown in FIG. 2, according to the image forming apparatus 1, the cover 2B supports the drawer 4 in the state where the cover 2B is located at the opening position and the drawer 4 is located at the outer position.

Thereby, it is possible to stably support the drawer 4 at the outer position and to smoothly replace the drum cartridge 5 and the developing cartridge 7.

Also, as shown in FIG. 2, according to the image forming apparatus 1, the developing cartridge 7 is attachable to and detachable from the drum cartridge 5 with the drum cartridge 5 being mounted to the drawer 4 in the state where the cover 2B is located at the opening position and the drawer 4 is located at the outer position.

Thereby, it is possible to replace only the developing cartridge 7 without demounting the drum cartridge 5 from the drawer 4.

For this reason, it is possible to simply replace the developing cartridge 7. At this time, since the toner container 7B of the developing cartridge 7 is located above the waste toner container 34, the waste toner container 34 does not interfere the operations of attaching and detaching the developing cartridge 7.

Also, as shown in FIG. 2, according to the image forming apparatus 1, when the developing cartridge 7 is being attached to the drum cartridge 5, the upper surface S1 of the waste toner container 34 may come into contact with the lower surface S2 of the toner container 7B of the developing cartridge 7, so that the waste toner container 34 guides the developing cartridge 7.

Thereby, while supporting the developing cartridge 7 with the upper surface S1 of the waste toner container 34, it is possible to attach the developing cartridge 7 to the drum cartridge 5.

For this reason, it is possible to smoothly replace the developing cartridge 7. In particular, even when the developing cartridge 7 is large and heavy, it is possible to smoothly replace the developing cartridge 7.

6. Second Exemplary Embodiment

Subsequently, a second exemplary embodiment is described with reference to FIGS. 9 and 10. In the second exemplary embodiment, the same members as the first exemplary embodiment are denoted with the same reference numerals, and the descriptions thereof are omitted.

6.1 Sheet Feeding Tray

Figure 9:
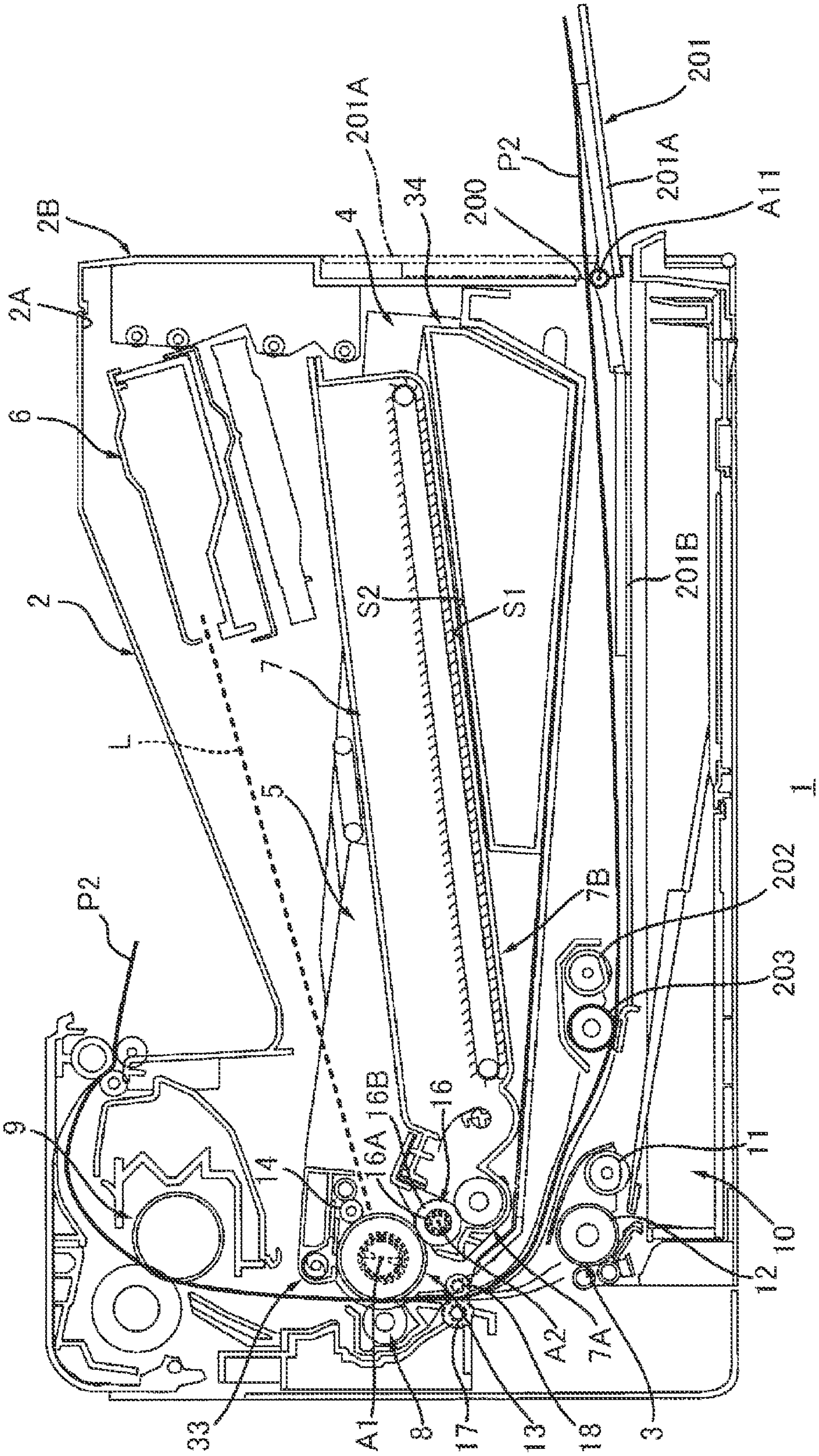
FIG. 9 is a schematic configuration view of an image forming apparatus according to a second exemplary embodiment.
Figure 10:
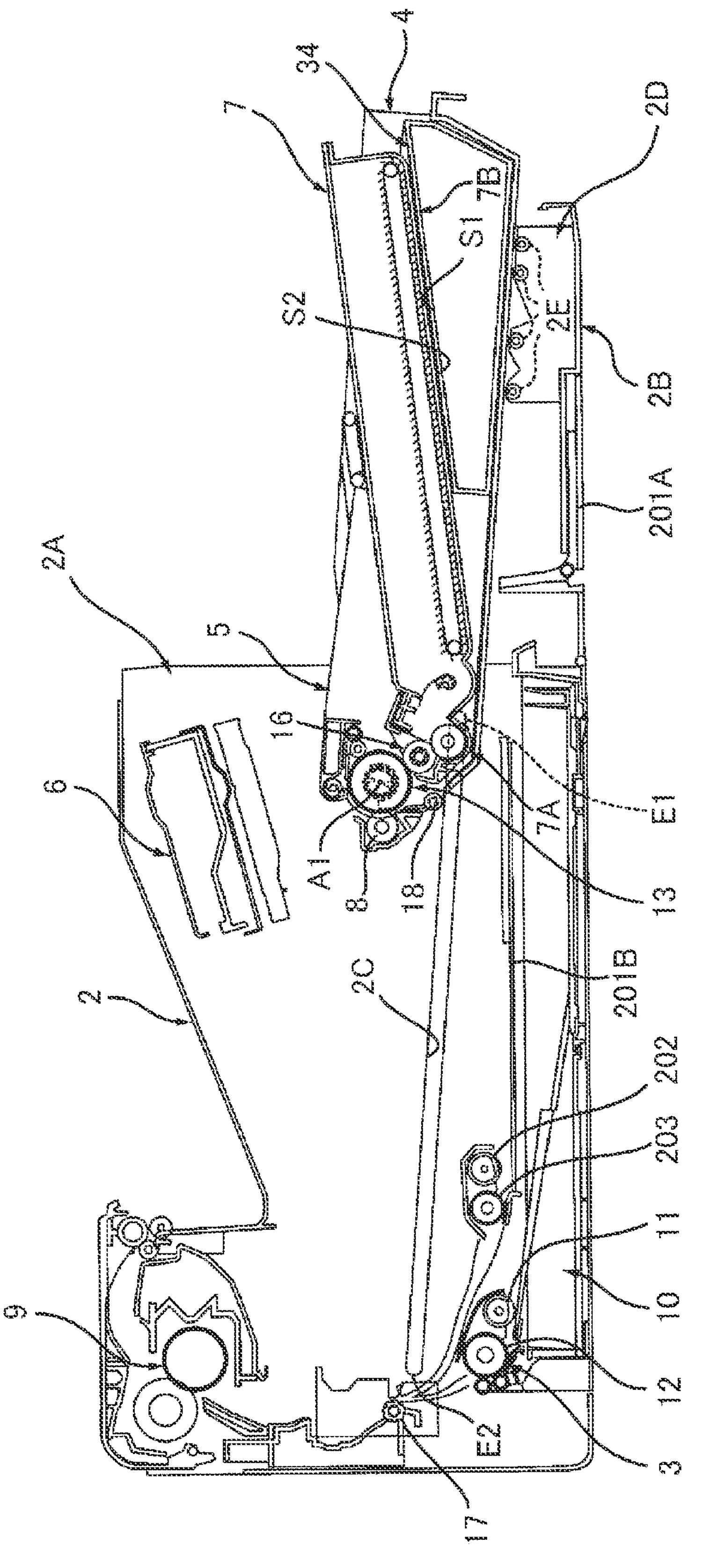
FIG. 10 depicts a state where the drawer shown in FIG. 9 is located at an outer position.

As shown in FIG. 9, the image forming apparatus 1 of the second exemplary embodiment has a second opening 200, and includes a sheet feeding tray 201, a second pickup roller 202, and a second feeder roller 203.

The second opening 200 is provided to the cover 2B.

The sheet feeding tray 201 is a so-called multi manual sheet feeding tray. The user can put a plurality of printing media P2 on the sheet feeding tray 201 through the second opening 200. The printing medium P2 is usually a printing medium different from the printing medium P (see FIG. 1). For example, when the printing medium P is an A4-sized printing sheet, the printing medium P2 is a postcard and the like. The plurality of printing media P2 put on the sheet feeding tray 201 is introduced one by one into the main body housing 2 through the second opening 200 by the second pickup roller 202. In the meantime, the sheet feeding tray 201 has a first part 201A and a second part 201B.

The first part 201A is mounted to an outer surface of the cover 2B. The first part 201A is configured to be movable relative to the cover 2B between a first position shown with the solid line in FIG. 9 and a second position shown with the virtual line in FIG. 9, in the state where the cover 2B is located at the closing position. The sheet feeding tray 201 is configured to be pivotable relative to a shaft A11 between the first position and the second position. When the cover 2B is located at the closing position and the first part 201A is located at the first position, the first part 201A is located at an opposite side to the second part 201B with respect to the second opening 200 of the cover 2B. When the cover 2B is located at the closing position and the first part 201A is located at the first position, the first part 201A extends in substantially the horizontal direction. Also, when the cover 2B is located at the closing position and the first part 201A is located at the second position, the first part 201A extends in the vertical direction along the outer surface of the cover 2B.

The second part 201B is located in the main body housing 2. Specifically, the second part 201B is located between the drawer 4 and the cassette 10 in the vertical direction in the state where the drawer 4 is located at the inner position. The second part 201B is located between the second pickup roller 202 and the first part 201A in the horizontal direction in the state where the cover 2B is located at the closing position and the first part 201A is located at the first position. The second part 201B extends in substantially the horizontal direction. The second part 201B is connected to the first part 201A in the state where the cover 2B is located at the closing position. In the meantime, the connection between the first part 201A and the second part 201B is released in the state where the cover 2B is located at the opening position.

The second pickup roller 202 is configured to convey the printing medium P put on the sheet feeding tray 201 toward the second feeder roller 203. The second pickup roller 202 is located closer to the fixing device 9 than to the opening 2A in the horizontal direction in the state where the cover 2B is located at the closing position. Thereby, it is possible to make the main body housing 2 thin at a side at which the cover 2B is provided. The second pickup roller 202 is located between the drawer 4 and the cassette 10 in the vertical direction in the state where the drawer 4 is located at the inner position.

The second feeder roller 203 is configured to convey the printing medium P from the second pickup roller 202 toward the conveying roller 17. The second feeder roller 203 is located at an opposite side to the second opening 200 with respect to the second pickup roller 202, in the state where the cover 2B is located at the closing position. The second feeder roller 203 is located between the drawer 4 and the cassette 10 in the vertical direction in the state where the drawer 4 is located at the inner position.

6.2 Transfer Roller

In the image forming apparatus 1 of the second exemplary embodiment, the transfer roller 8 is provided to the drum cartridge 5. Thereby, in a state where the drum cartridge 5 is demounted from the image forming apparatus 1, it is possible to cover and protect the photosensitive drum 13 with the transfer roller 8.

6.3 Operational Effects of Second Exemplary Embodiment

Also in the second exemplary embodiment, it is possible to accomplish the same operational effects as the first exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus configured to form an image on a printing medium, the image forming apparatus comprising:

a photosensitive drum rotatable relative to a rotary axis extending in an axial direction;

an exposure device configured to expose the photosensitive drum to laser light beam to form a latent image on a peripheral surface of the photosensitive drum;

a developing device including a developing roller configured to form a toner image by developing the latent image formed on the photosensitive drum by toner;

a toner container configured to accommodate therein toner that is to be supplied to the developing roller;

a cleaner configured to remove waste toner from a peripheral surface of the photosensitive drum after the toner image has been transferred to the printing medium;

a waste toner container configured to accommodate therein the waste toner removed from the peripheral surface of the photosensitive drum by the cleaner; and a waste toner conveying pipe configured to convey the waste toner from the cleaner to the waste toner container, the waste toner conveying pipe including a conveying member, wherein the waste toner conveying pipe is located outside an exposure range of the laser light beam when viewed from a vertical direction, and intersects the laser light beam when viewed from the axial direction, wherein the waste toner container is located below the cleaner in the vertical direction when viewed from the axial direction, and wherein the waste toner conveying pipe extends downward in a direction that extends from the cleaner and toward the waste toner container.

2. The image forming apparatus according to claim 1, further comprising:

a first side plate and a second side plate configured to support both ends of the photosensitive drum in the axial direction, wherein a part of the waste toner conveying pipe is located at an opposite side to the first side plate with respect to the photosensitive drum.

3. The image forming apparatus according to claim 2, wherein the exposure device is configured to expose the photosensitive drum to laser light beam between the first side plate and the second side plate.

4. The image forming apparatus according to claim 2, wherein the waste toner conveying pipe is connected to the waste toner container at the opposite side to the first side plate with respect to the photosensitive drum.

5. The image forming apparatus according to claim 4, wherein the waste toner container has a rear end, and wherein the waste toner conveying pipe is connected to the rear end of the waste toner container.

6. The image forming apparatus according to claim 2, wherein the toner container is located between the first side plate and the second side plate when viewed from the vertical direction, and wherein the waste toner conveying pipe intersects the toner container when viewed from the axial direction.

7. The image forming apparatus according to claim 6, wherein the toner container is configured to attach to and detach from the first side plate and the second side plate, and wherein the first side plate comprises a first attaching and detaching guide, and the second side plate comprises a second attaching and detaching guide.

8. The image forming apparatus according to claim 7, wherein the waste toner conveying pipe is located farther from the toner container than the second attaching and detaching guide in the axial direction.

9. The image forming apparatus according to claim 7, wherein each of the first attaching and detaching guide and the second attaching and detaching guide is configured to guide a developing cartridge including the developing device and the toner container.

10. The image forming apparatus according to claim 1, further comprising:

a cassette configured to accommodate therein a plurality of printing media;

a conveying roller configured to convey a printing medium accommodated in the cassette;

a transfer roller is located to face the photosensitive drum and configured to transfer the toner image formed on the photosensitive drum to the printing medium conveyed by the conveying roller.

11. The image forming apparatus according to claim 1, further comprising:

a fixing device spaced upward from the photosensitive drum.

* * * * *